UNITED STATES PATENT OFFICE.

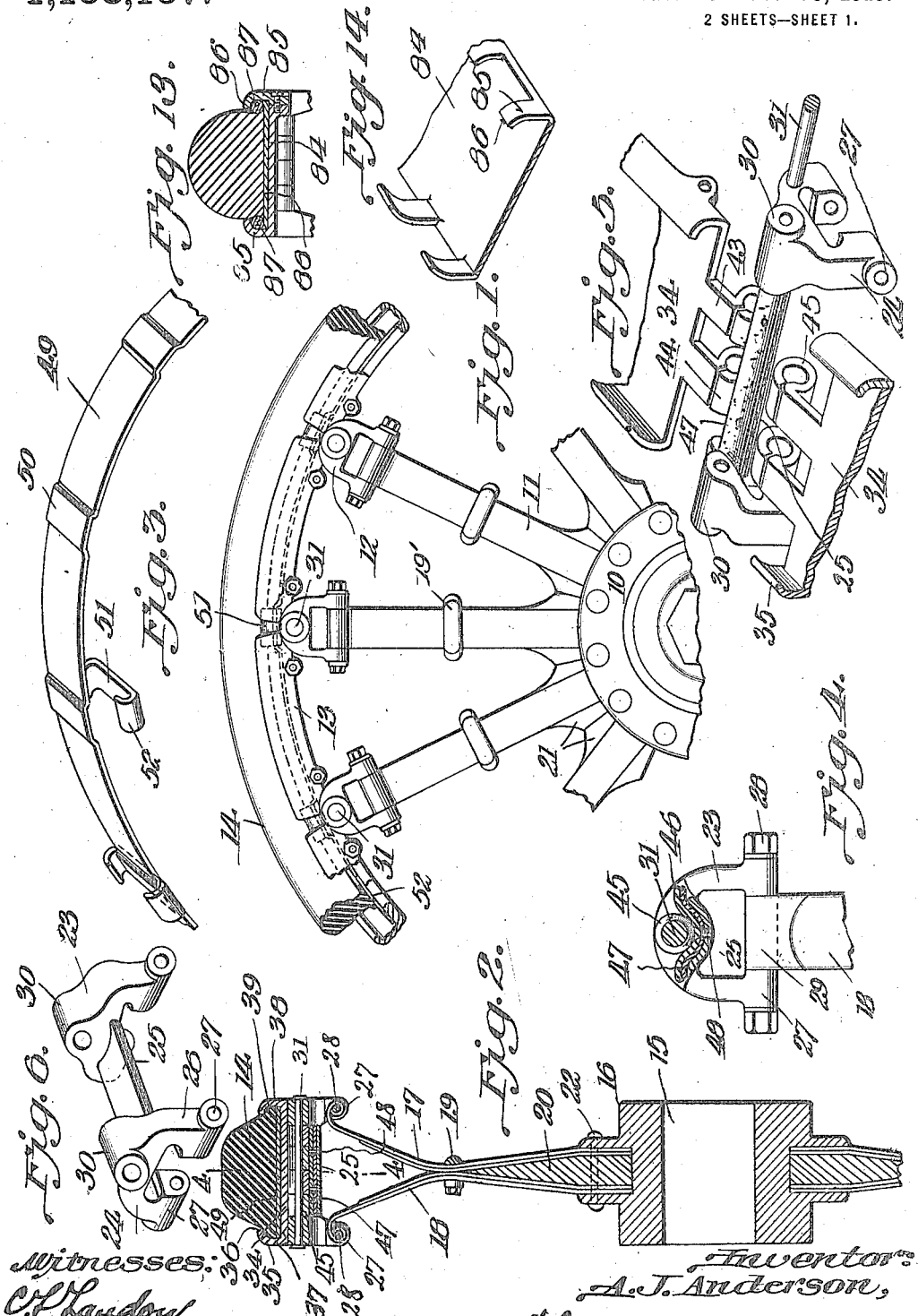

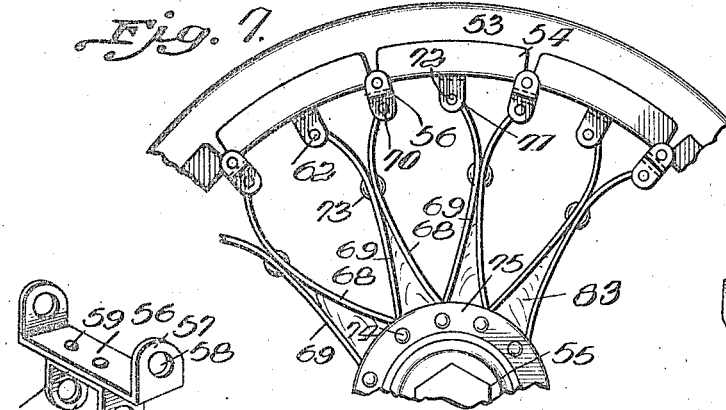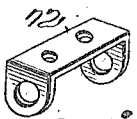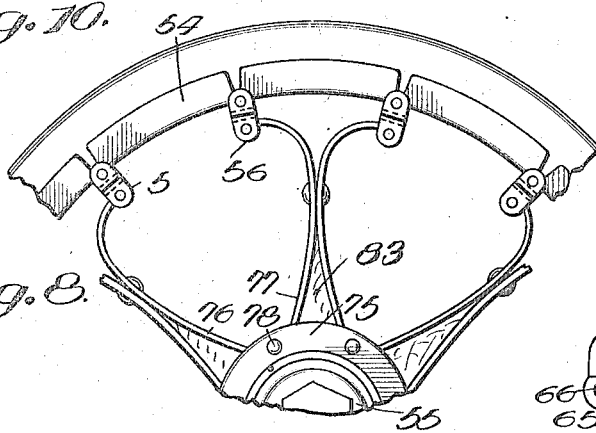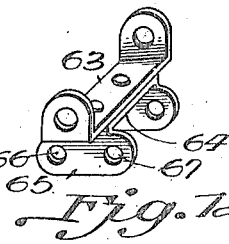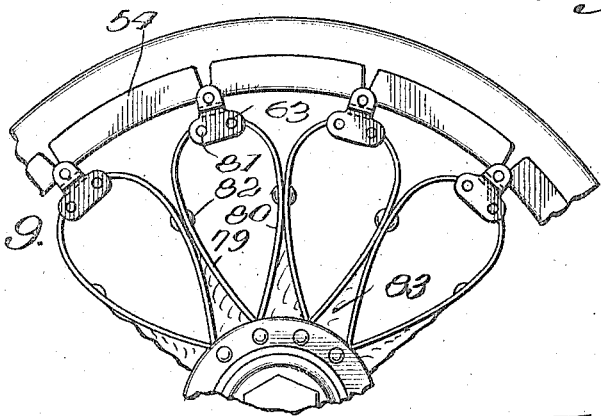

ARTHUR J. ANDERSON, OF CHICAGO HEIGHTS, ILLINOIS.

SPRING-WHEEL.

1,158,157.　　　Specification of Letters Patent.　　Patented Oct. 26, 1915.

Application filed May 29, 1914. Serial No. 841,904.

*To all whom it may concern:*

Be it known that I, ARTHUR J. ANDERSON, citizen of the United States, residing at Chicago Heights, in the county of Cook and State of Illinois, have invented certain new and useful Improvements in Spring-Wheels, of which the following is a specification.

My invention relates to new and useful improvements in spring wheels, and as its principal object aims to provide a wheel in which the spokes consist in substantially Y-shaped leaf springs, to the arms of which is pivotally connected a sectional rim.

A further object is to provide a rim which consists in a number of substantially channel-shaped sections, which are equal in length to the space between the outer terminals of the spokes, and are pivotally connected to each other and to the outer terminals of the spokes, being arranged to form an annular channel for the reception of a solid tread member or shoe.

A still further object is to provide a novel form of coupling member, which serves not only to pivotally unite and support the adjacent terminals of the various rim sections, but also serves to pivotally connect the rims to the outer terminals of the spokes and to hold the outer ends of the spoke arms against lateral displacement.

The above and additional objects are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a side elevation of a portion of a wheel embodying the preferred form of my invention; Fig. 2 is a fragmentary vertical sectional view illustrating the mounting of the wheel rim; Fig. 3 is a perspective view of a metallic band or liner which is placed in the channel-shaped rim and acts as a locking ring for holding a number of tire protecting clips in position on the rim; Fig. 4 is an enlarged section taken on the line 4—4 of Fig. 2; Fig. 5 is a perspective view showing the meeting terminals of a pair of rim sections in disassembled relation, but indicating the manner in which they are adapted to be connected; Fig. 6 is a detail perspective view of the preferred form of coupling member employed in pivotally connecting the sections of the rim to each other and to the arms of the Y-shaped spoke members; Fig. 7 is a side elevation of a section of a wheel showing a modified form of my invention; Fig. 8 is a side elevation of a wheel section showing a further modification; Fig. 9 is a side elevation of a section of a wheel disclosing a still further modified form; Fig. 10 is a detail perspective view illustrating a modified form of coupling yoke employed in connection with sections of the rim; Fig. 11 is a detail perspective view illustrating a modified form of attaching clip employed in securing the outer terminals of the spokes to the wheel rim; and Fig. 12 is a detail view of a modified form of coupling yoke. Fig. 13 is a sectional view showing a modified form of tire holding means, and Fig. 14 is a fragmentary perspective view of a portion of one of the base plates employed in that form of fastening device shown in Fig. 13.

In the embodiment of my invention shown in the accompanying drawings, the wheel includes, as its essential features of construction, a hub 10, a plurality of spokes 11, a number of coupling members 12, a sectional rim 13, which is connected to the spokes by the coupling members 12 and receives the solid rubber tire or tread member 14. The hub 10 consists, as best illustrated in Fig. 2, in a body portion 15 and a pair of circular plate members 16, which are arranged in the central portion of the hub and in parallel spaced relation to each other, so that they may receive between their inner faces the inner ends of the spokes 11. These spokes 11 are, as previously stated, substantially Y-shape. Each spoke is preferably constructed of two pairs of leaf springs 17 and 18. These members 17 and 18 are connected intermediate their length by a bolt 19, as in Fig. 2, or a clamp 19', as in Fig. 1, and a substantially wedge-shaped spacing block 20 is interposed between the inner ends of the springs, having its outer terminal extending to the connecting bolt 19. It will be seen upon reference to Fig. 1 that the extreme inner ends of the spacing blocks 20 are enlarged, as indicated at 21, and that the edges of these enlarged portions 21 are inwardly convergent so that the head portions 21 of the several blocks will engage flatly against each other when the spokes are inserted between the plate members 16. Bolts, indicated at 22, are employed in properly securing the inner extremity of each spoke in position in the annular channel which is formed by the body 15 of the hub and the plate members 16. As shown in Fig. 2 particularly, the upper terminals of the outermost leaf of each of the spring members 17 and 18 are spread so that each spoke is in conformation substantially Y-shaped, the spacing block 20 and inner portions of the members 17 and 18 constituting the stem of the Y, and the outer portions of the springs 17 and 18 which lie beyond the connecting bolt 19 constituting the arms of the Y. The upper terminals of the spring arms are held in spread relation by the coupling members 12, to which they are pivotally connected.

The coupling members 12 are all substantially identical in construction, and it is deemed necessary, therefore, to describe only one of them in detail, for which purpose reference will now be had particularly to Fig. 6. As shown in this figure, each coupling includes a pair of terminal yoke members 23 and 24, and a channel-shaped bridge 25 which is cast with the members 23 and 24 and serves to rigidly space and connect these members. Each of the yokes 23 and 24 is substantially U-shaped in its preferred embodiment, and is provided at the lower terminals of its arms 26 with the alined bearings 27. The adjacent terminals of the bearings 27 of each yoke 23 and 24 are spaced a sufficient distance to permit them to snugly receive the outer terminals of the spring arms, as best shown in Fig. 4. Upon reference to this figure, it will be seen that the outer terminals of the spring arms are connected to the yokes 23 and 24 by a pivot bolt 28 which is passed through the alined bearings 27 and receives the terminal rolled ear or tube 29, which is formed on the spoke arm in the well known manner. The bight portion of each of the yoke members 23 and 24 is provided with a tubular bearing 30. These members 30 of the two yokes 23 and 24 are longitudinally alined and receive a pivot bolt 31 which, as shown in Figs. 1 and 5, serves to connect the meeting terminals of the various sections which constitute the rim member 13. This rim member 13, as stated, consists in a number of channel-shaped sections, each of which, as shown in Fig. 1, is in length substantially equal to the distance between the outer terminals of the members 12. Each section of the rim is, as best shown in Fig. 2, formed in two pieces, one of which, indicated by the numeral 33, consists of an arcuate base plate 34 and an arcuate upstanding flange 35, the outer edge of which, indicated at 36, is directed inwardly to engage over the circumferential bead 37 of the solid rubber tire 14. The other piece of each rim section consists in a locking flange 38 which is engageable with the other circumferential bead 39 of the tread member 14. Each of the locking flanges 38 is provided on its inner edge with a pair of integral attaching lugs 40. These lugs 40 of each of the members 38 are apertured to receive bolts 41, which are threaded into the legs 42 formed on the edge of the base plate 34 and extend inwardly therefrom.

Upon reference to Fig. 2, it will be apparent that the bolts 41 serve to rigidly connect the locking flanges 38 to the base plates 34, and that, when in proper position with respect to each other, the base plates 34 and flanges 35 form an arcuate channel for the reception of the inner face of the circumferential beads 37 and 39 of the member 14. It will also be seen that the various sections of the rim, when pivotally connected in the manner to be hereinafter set forth, form an annular channel to receive the tread member and properly hold it in position on the spokes. The base plates of each of the rim sections are, as previously explained, adapted to be pivotally connected by the bolt members 31 which extend between the bearings 30 of the coupling members. For this purpose, each base plate is formed at each terminal with integral spaced hinge leaves, as indicated at 43 and 44 in Fig. 5. The hinge leaves of the meeting terminals of the various base plates are staggered with respect to each other so that they may be properly mated, as in Fig. 5, to bring their terminal tubes or ears 45 into registration for the reception of the bolts 31. The combined length of the four members 45 of the meeting terminals of each rim section is approximately equal to the distance between the confronting faces of the bearing members 30 of the coupling yokes, so that the base plates of the rim sections will be held against lateral movement during the use of the wheel.

As a means for protecting the hinge leaves 43 and 44 of the base plates against exposure to mud or the like, I arrange in the channel-shaped bridge member 25 of each of the coupling yokes, a channel-shaped leaf spring 46 and a strip of sheet rubber or some other similar fabric, as indicated at 47, which provide a guard. The member 47 is interposed between the spring 46 and the members 45 and, as shown in Fig. 4, obviously serves to protect these members 45 against mud and the like. Rivets or some equivalent fastening devices, indicated at 48, may be employed in properly securing the protecting rubber or fabric 47 to the spring member 46.

I have found that it is desirable to protect the inner face of the tread or tire member 14 against the wear which would ordinarily result from the swinging of the rim sections on their connecting bolts 31, and for this purpose have provided a metallic liner for the rim 13. This liner, which is illustrated in detail in Fig. 3 and is designated by the numeral 49, is formed from relatively light resilient sheet metal, which is struck up or stamped at equi-distantly spaced points to provide the channels 50. It will be seen, particularly upon reference to Fig. 1, that when the liner 49, which is annular in shape, is seated on the base plates 34 of the coupling sections, there will be provided at the junctions of the several rim sections a channel in which may be received the tie or body portions 51 of the U-shaped clip members shown in Fig. 3. By inserting the body portions 51 of these clips in the channels defined between the upstruck members 50 and the base plates 34, it is obvious that the clips are held against circumferential shifting in the rim and are also held against outward movement therefrom. The manner in which the terminal hook-shaped portions 52 of the U-shaped clips are engaged with the members 37 and 39 of the tire 44 will be readily appreciated upon reference to Fig. 1, in which dotted lines indicate the assembled position of the clips.

From the foregoing description, and upon reference to Fig. 2 particularly, it will be obvious that if the wheel is bearing a heavy load the arms of the Y-shaped spoke members will yield when the portion of the tread member which is immediately adjacent them comes into engagement with the roadbed. It is to be explained, however, that while the arms of the spokes will yield sufficiently to the load to absorb the major portion of the shocks to which the wheel is subjected when passing over a rough or uneven road, they are designed so that there will be no continued rebound or vibration of the various springs when a rut or other foreign object in the roadbed is encountered. This elimination of undesirable rebounds or vibrations of undue duration is accomplished by shortening the effective length of the spring arms through the medium of the connecting bolt 19 and spacing block 20. It is desirable to mention in this connection the fact that the elimination of undue vibration or rebound of the spring spokes is one of the principal features of my invention, and one which has proved in practice to particularly adapt the wheel for use in connection with heavy motor trucks as well as pleasure cars.

In taking up the description of the modified forms of my wheel, as shown in Figs. 7, 8 and 9, it may be well to explain before going into the structural details of the modifications that these modified forms are all constructed as regards their rims and hubs in the same manner as the preferred form of the wheel. These modified forms of Figs. 7, 8 and 9 differ from the preferred form only in the arrangement of the spring spoke members and the attaching yokes and clips which are employed in connecting the spokes to the rim. It will be observed upon reference to Figs. 7, 8 and 9 that in each modified form of the invention there is provided a tire 53, a rim which consists in a number of pivotally united sections 54 similar to the members 13 of the preferred form of the invention, and a hub 55, also similar to the corresponding member 10 of the preferred form. For pivotally uniting the rim sections 54 of the modified forms of my invention shown in Figs. 7, 8 and 9, I employ either the coupling yoke shown in Fig. 10 or the device shown in Fig. 12. The coupling yoke of Fig. 10 includes a substantially U-shaped body portion 56, the arms 57 of which are apertured, as at 58, to receive the pivot bolt which is inserted through the hinge lugs of the meeting terminals of the rim sections 54. To the underside of the member 56 is secured, as by rivets, indicated at 59, a substantially U-shaped clip 60, the arms 61 of which are dependent and are apertured to receive a bolt 62, whereby the terminals of the spring spokes may be secured to the coupling. The form of coupling yoke shown in Fig. 12 includes a body 63 similar to the member 56 of Fig. 10. The coupling yoke shown in Fig. 12 differs from that disclosed in Fig. 10 only in that the U-shaped clip 64 is provided with arms 65 which are enlarged at each side so that a pair of apertures, indicated at 66 and 67, may be formed in each arm of the clip. The necessity of having two bolt receiving apertures in each arm of the clip 64 arises when the spokes of the wheel are arranged in the manner disclosed in Fig. 9.

In the modified form of the invention shown in Fig. 7, the spokes are arranged with their wide surfaces extending at right angles to the plane of the wheel, as clearly shown. The spokes are arranged in pairs, as indicated at 68 and 69 in Fig. 7. The one spoke 68 of each pair is secured to one of the couplings 56 by a pivot bolt 70, while the other spoke 69 of each pair is connected by a bolt 71 to a U-shaped clip 72 which is secured to the approximate middle of a rim section 54. The U-shaped clip 72 is of the form shown in Fig. 11. In the modification of Fig. 7 the spokes 68 and 69 of the adjacent pairs are connected intermediate their length as by a bolt or clamp, indicated at 73. The inner terminals of each pair of spokes are secured by a single bolt 74 between the plates 75 of the hub, which are similar to the plates 16 of the preferred form of the invention.

In the modification illustrated in Fig. 8, I also employ pairs of leaf springs for spokes. The individual springs of each pair, designated by the numerals 76 and 77, are secured at their inner terminals by a single bolt 78 between the plates 75 of the hub 55, and are secured at their outer terminals to the coupling members 56 at opposite ends of a rim section 54. These leaf spring members 76 are also arranged, as in Fig. 7, with their wide surfaces extending at right angles to the plane of the wheel. In the form of my invention shown in Fig. 9, the springs are also arranged in pairs, the individual springs of each pair being designated by the numerals 79 and 80. In this form of the invention, a pair of springs is connected by pivot bolts 81 to each coupling member 63, so that each terminal of each rim section 54 is supported by a pair of leaf springs. Bolts or clamps 82 are employed in connecting the adjacent springs of each adjacent pair.

In the three modified forms of my invention illustrated in Figs. 7, 8 and 9, I employ spacer blocks 83 between the lower terminals of the adjacent springs so that the springs may be held against abnormal yielding when sustaining a shock.

While I preferably employ as a means for holding the tire 14 in position on the rim, the members 35 and 38, I have found it desirable in some instances to substitute for these fastening means the form of fastening device illustrated in detail in Figs. 13 and 14. Referring now to these figures, it will be seen that in this modification the base plates 84 of the rim sections, which correspond with the members 34 of the preferred form of the invention, are provided on their edges with the upstanding, circumferentially spaced lugs 85. These lugs 85 are bent inwardly at their upper terminals, as indicated at 86 in Fig. 13, so that they may engage over the wire ropes or cables 87 which are wound around the tire on each side thereof and in engagement with the beads of the tire. It will be obvious that when the wire cables or ropes 87 have been applied to the beads of the tire, they are held in the desired locking relation thereto by the lugs 85. It is also to be noted that in the modified form of the invention illustrated in Figs. 13 and 14, a liner 88, similar to the member 49 of the preferred form of the invention, is employed for preventing wear of the tire through engagement with the hinged terminals of the rim sections.

Having thus described the invention, what is claimed as new is:—

1. A vehicle wheel including a hub, a plurality of spokes, a rim consisting of a plurality of channel-shaped sections, hinge leaves formed at the terminals of each rim section, coupling members for connecting the rim sections, each of said coupling members including a channel-shaped bridge member and a substantially U-shaped yoke carried by each terminal thereof, each of said yokes having a bolt receiving bearing, a bolt extending through the bearings of the yokes and through the hinge leaves of the rim sections, a channel-shaped leaf spring seated in the bridge member, a sheet of packing material interposed between the hinge leaves and the leaf spring, and bolts pivotally connecting the terminals of the spokes to the arms of the coupling yokes.

2. A vehicle wheel including a hub, a plurality of spokes radiating from the hub, each of said spokes including yieldable elements connected intermediate their ends and having their respective extremities diverging with the inner extremities of said elements connected to the hub, blocks filling the space between the inner extremities of the elements of the spokes, coupling yokes pivotally connected to the outer extremities of the elements of the spokes, and a rim carried by said yokes.

3. A vehicle wheel including a hub, a plurality of spokes radiating from the hub, a coupling member swingingly connected to the outer extremity of each of said spokes and including a bridge piece, a sectional rim having hinge leaves swingingly connected to said members, and a guard carried by each of said bridge pieces and arranged therebetween and the adjacent hinge leaves of the rim.

4. A vehicle wheel including a hub, a plurality of spokes radiating therefrom, a coupling member carried by the outer extremity of each of said spokes and including a bridge piece, a sectional rim having hinge leaves swingingly connected to said members, and a channel shaped spring carried by each of said bridge pieces and interposed therebetween and the adjacent hinge leaves of the rim.

5. A vehicle wheel including a hub, a plurality of spokes radiating from the hub, coupling members carried by the outer extremities of said spokes and each including a bridge piece, a sectional rim having hinge leaves swingingly connected to said members, a yieldable element carried by each of said bridge pieces, and a packing interposed between each of said yieldable elements and the adjacent hinge leaves of the rim.

6. A vehicle wheel including a hub, a plurality of spokes radiating from the hub and each having diverging outer extremities, a coupling member including terminal yokes joined by a bridge piece carried by each of said spokes with the said yokes swingingly connected to the diverging outer ends thereof, a sectional rim provided with mating hinge leaves at the contiguous ends of the sections thereof, a bolt extending between the yokes of each of said members and swingingly supporting the adjacent hinge leaves of said sections, and a guard carried by each of said bridge pieces and interposed therebetween and the contiguous hinge leaves of the rim.

7. A vehicle wheel including a hub, a plurality of spokes radiating therefrom, a sectional rim swingingly connected to the outer extremities of the spokes with the contiguous ends of adjacent sections disposed in spaced relation, a liner fitting within the rim, and a plurality of clips engaging the liner and filling the space between contiguous ends of said sections.

8. A vehicle wheel including a hub having a plurality of spokes radiating therefrom, a sectional rim swingingly supported by the outer extremities of said spokes with contiguous ends of adjacent sections disposed in spaced relation, a liner fitting within the rim, and a plurality of clips embracing the liner and filling the space between contiguous ends of said sections.

9. A vehicle wheel including a hub having a plurality of spokes radiating therefrom, a sectional rim pivotally connected to the outer extremities of said spokes and arranged with contiguous ends of adjacent sections disposed in spaced relation, a liner fitting within the rim and provided with a plurality of channels, and a plurality of clips fitting within said channels and filling the space between contiguous ends of said sections.

In testimony whereof I affix my signature in presence of two witnesses.

ARTHUR J. ANDERSON. [L. S.]

Witnesses:
   Roy Dunlap,
   Irving W. Kelley.

Copies of this patent may be obtained for five cents each, by addressing the "Commissioner of Patents, Washington, D. C."